(12) United States Patent
Sommers

(10) Patent No.: US 11,323,354 B1
(45) Date of Patent: May 3, 2022

(54) METHODS, SYSTEMS, AND COMPUTER READABLE MEDIA FOR NETWORK TESTING USING SWITCH EMULATION

(71) Applicant: Keysight Technologies, Inc., Santa Rosa, CA (US)

(72) Inventor: Christian Paul Sommers, Bangor, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/067,627

(22) Filed: Oct. 9, 2020

(51) Int. Cl.
| | |
|---|---|
| *G06F 15/173* | (2006.01) |
| *H04L 43/50* | (2022.01) |
| *H04L 43/062* | (2022.01) |
| *H04L 67/133* | (2022.01) |
| *H04L 43/08* | (2022.01) |
| *H04L 41/12* | (2022.01) |
| *H04L 49/00* | (2022.01) |

(52) U.S. Cl.
CPC ............. *H04L 43/50* (2013.01); *H04L 41/12* (2013.01); *H04L 43/062* (2013.01); *H04L 43/08* (2013.01); *H04L 49/70* (2013.01); *H04L 67/40* (2013.01)

(58) Field of Classification Search
CPC ....... H04L 43/50; H04L 41/12; H04L 43/062; H04L 43/08; H04L 49/70; H04L 67/40
USPC .................................................. 709/223, 224
See application file for complete search history.

(56) References Cited

U.S. PATENT DOCUMENTS

| | | |
|---|---|---|
| 4,792,753 A | 12/1988 | Iwai |
| 5,247,517 A | 9/1993 | Ross et al. |
| 5,343,463 A | 8/1994 | Van Tetering et al. |
| 5,390,314 A | 2/1995 | Swanson |
| 5,477,531 A | 12/1995 | McKee et al. |
| 5,535,338 A | 7/1996 | Krause et al. |

(Continued)

FOREIGN PATENT DOCUMENTS

| | | |
|---|---|---|
| CN | 104320274 A | 1/2015 |
| CN | 107104903 A | 8/2017 |

(Continued)

OTHER PUBLICATIONS

Commonly-assigned, co-pending U.S. Appl. No. 17/069,768 for "Methods, Systems and Computer Readable Media for Active Queue Management," (Unpublished, filed Oct. 13, 2020).

(Continued)

*Primary Examiner* — Liang Che A Wang

(57) ABSTRACT

One method occurs at a network test system implemented using at least one processor. The method includes receiving configuration information for configuring a network testing scenario comprising an emulated switching environment, wherein the configuration information includes topology information defining the emulated switching environment; configuring, using the configuration information, the emulated switching environment including allocating, using a switch application-specific integrated circuit (ASIC) resource allocator, resources of at least one physical ASIC switch to multiple emulated switches; and configuring, using the configuration information, a test session for testing a system under test (SUT) using the emulated switching environment and a network visibility infrastructure for obtaining performance information associated with the test session.

20 Claims, 5 Drawing Sheets

(56) References Cited

U.S. PATENT DOCUMENTS

| | | |
|---|---|---|
| 5,568,471 A | 10/1996 | Hershey et al. |
| 5,583,792 A | 12/1996 | Li et al. |
| 5,590,285 A | 12/1996 | Krause et al. |
| 5,600,632 A | 2/1997 | Schulman |
| 5,657,438 A | 8/1997 | Wygodny et al. |
| 5,671,351 A | 9/1997 | Wild et al. |
| 5,751,963 A | 5/1998 | Umetsu |
| 5,761,486 A | 6/1998 | Watanabe et al. |
| 5,787,147 A | 7/1998 | Gundersen |
| 5,787,253 A | 7/1998 | McCreery et al. |
| 5,812,780 A | 9/1998 | Chen et al. |
| 5,822,520 A | 10/1998 | Parker |
| 5,838,919 A | 11/1998 | Schwaller et al. |
| 5,850,386 A | 12/1998 | Anderson et al. |
| 5,850,388 A | 12/1998 | Anderson et al. |
| 5,854,889 A | 12/1998 | Liese et al. |
| 5,878,032 A | 3/1999 | Mirek et al. |
| 5,905,713 A | 5/1999 | Anderson et al. |
| 5,974,237 A | 10/1999 | Shurmer et al. |
| 5,974,457 A | 10/1999 | Waclawsky et al. |
| 5,978,940 A | 11/1999 | Newman et al. |
| 5,982,852 A | 11/1999 | Schwartz |
| 6,031,528 A | 2/2000 | Langfahl, Jr. |
| 6,044,091 A | 3/2000 | Kim |
| 6,108,800 A | 8/2000 | Asawa |
| 6,122,670 A | 9/2000 | Bennett et al. |
| 6,148,277 A | 11/2000 | Asava et al. |
| 6,172,989 B1 | 1/2001 | Yanagihara et al. |
| 6,173,333 B1 | 1/2001 | Jolitz et al. |
| 6,189,031 B1 | 2/2001 | Badger et al. |
| 6,233,256 B1 | 5/2001 | Dieterich et al. |
| 6,279,124 B1 | 8/2001 | Brouwer et al. |
| 6,295,557 B1 | 9/2001 | Foss et al. |
| 6,317,788 B1 | 11/2001 | Richardson |
| 6,321,264 B1 | 11/2001 | Fletcher et al. |
| 6,345,302 B1 | 2/2002 | Bennett et al. |
| 6,363,056 B1 | 3/2002 | Beigi et al. |
| 6,430,617 B1 | 8/2002 | Britt et al. |
| 6,446,121 B1 | 9/2002 | Shah et al. |
| 6,507,923 B1 | 1/2003 | Wall et al. |
| 6,526,259 B1 | 2/2003 | Ho |
| 6,542,854 B2 | 4/2003 | Yang et al. |
| 6,545,979 B1 | 4/2003 | Poulin |
| 6,601,020 B1 | 7/2003 | Myers |
| 6,621,805 B1 | 9/2003 | Kondylis et al. |
| 6,678,246 B1 | 1/2004 | Smyth |
| 6,717,917 B1 | 4/2004 | Weissberger et al. |
| 6,769,054 B1 | 7/2004 | Sahin et al. |
| 6,792,393 B1 | 9/2004 | Farel et al. |
| 6,826,259 B2 | 11/2004 | Hoffman |
| 6,845,352 B1 | 1/2005 | Wang |
| 6,917,595 B2 | 7/2005 | Chang et al. |
| 7,096,264 B2 | 8/2006 | Bonney et al. |
| 7,099,438 B2 | 8/2006 | Rancu et al. |
| 7,123,616 B2 | 10/2006 | Weissberger et al. |
| 7,143,159 B1 | 11/2006 | Grace et al. |
| 7,159,184 B2 | 1/2007 | Ullah et al. |
| 7,222,255 B1 | 5/2007 | Claessens et al. |
| 7,277,395 B2 | 10/2007 | Rosen et al. |
| 7,304,951 B2 | 12/2007 | Rhee |
| 7,327,686 B2 | 2/2008 | Standridge |
| 7,328,134 B1 | 2/2008 | Burbidge, III et al. |
| 7,342,897 B1 | 3/2008 | Nader et al. |
| 7,366,174 B2 | 4/2008 | MacFaden et al. |
| 7,418,492 B1 | 8/2008 | Cohen et al. |
| 7,486,728 B2 | 2/2009 | Park |
| 7,507,948 B2 | 3/2009 | Park et al. |
| 7,525,473 B2 | 4/2009 | Chu et al. |
| 7,526,691 B1 | 4/2009 | Jayabharathi et al. |
| 7,603,372 B1 | 10/2009 | Honicky, Jr. et al. |
| 7,627,669 B2 | 12/2009 | Dugatkin et al. |
| 7,730,492 B1 | 6/2010 | Blaukopf et al. |
| 7,814,495 B1 | 10/2010 | Lim et al. |
| 7,840,664 B2 | 11/2010 | Dugatkin et al. |
| 7,865,908 B2 | 1/2011 | Garg et al. |
| 7,873,056 B2 | 1/2011 | Higuchi et al. |
| 7,890,951 B2 | 2/2011 | Vinberg et al. |
| 7,899,048 B1 | 3/2011 | Walker et al. |
| 7,908,130 B2 | 3/2011 | Van Ginkel et al. |
| 7,945,657 B1 | 5/2011 | McDougall et al. |
| 7,979,225 B2 | 7/2011 | Muller et al. |
| 8,068,602 B1 | 11/2011 | Bluman et al. |
| 8,145,470 B2 | 3/2012 | Green |
| 8,286,147 B2 | 10/2012 | Alpern et al. |
| 8,694,644 B2 | 4/2014 | Chen et al. |
| 8,718,070 B2 | 5/2014 | Koponen et al. |
| 8,761,187 B2 | 6/2014 | Barde |
| 8,805,951 B1 | 8/2014 | Faibish et al. |
| 8,898,333 B1 | 11/2014 | White et al. |
| 8,914,432 B2 | 12/2014 | Hannel et al. |
| 8,942,109 B2 | 1/2015 | Dorenbosch et al. |
| 8,949,830 B2 | 2/2015 | Kannan et al. |
| 8,959,185 B2 | 2/2015 | Nakil et al. |
| 8,984,341 B1 | 3/2015 | Chandrasekharapuram et al. |
| 9,042,245 B2 | 5/2015 | Tzannes et al. |
| 9,049,271 B1 * | 6/2015 | Hobbs .......... H04L 65/601 |
| 9,065,770 B2 | 6/2015 | Chew et al. |
| 9,231,849 B2 | 1/2016 | Hyoudou et al. |
| 9,294,296 B2 | 3/2016 | Kirschnick et al. |
| 9,317,252 B2 | 4/2016 | Roy et al. |
| 9,436,566 B2 | 9/2016 | Panda et al. |
| 9,503,382 B2 | 11/2016 | DeCusatis et al. |
| 9,507,616 B1 | 11/2016 | Ramanath et al. |
| 9,524,299 B2 | 12/2016 | Lahiri et al. |
| 9,529,684 B2 | 12/2016 | Sincan et al. |
| 9,544,233 B2 | 1/2017 | Ansari et al. |
| 9,614,689 B2 | 4/2017 | Cook et al. |
| 9,628,339 B1 | 4/2017 | Thai et al. |
| 9,647,909 B2 | 5/2017 | Kuan et al. |
| 9,674,639 B2 | 6/2017 | Qiu et al. |
| 9,680,728 B2 | 6/2017 | Besser |
| 9,705,849 B2 | 7/2017 | Sood et al. |
| 9,785,527 B2 | 10/2017 | Regev et al. |
| 9,819,551 B2 | 11/2017 | Forster et al. |
| 9,898,317 B2 | 2/2018 | Nakil et al. |
| 9,967,165 B2 | 5/2018 | Arora et al. |
| 10,015,072 B2 | 7/2018 | Cantwell et al. |
| 10,063,473 B2 | 8/2018 | Wenig |
| 10,135,702 B2 | 11/2018 | Lahiri |
| 10,341,215 B2 | 7/2019 | Ramanath et al. |
| 10,579,408 B2 | 3/2020 | Wang et al. |
| 10,623,296 B2 | 4/2020 | Haramaty et al. |
| 10,686,671 B1 * | 6/2020 | Mozumdar .......... H04L 41/145 |
| 10,733,088 B1 * | 8/2020 | Sommers .......... G06F 11/263 |
| 10,742,533 B2 | 8/2020 | Yadav et al. |
| 10,868,730 B2 * | 12/2020 | Mozumdar .......... H04L 43/06 |
| 10,880,019 B1 | 12/2020 | Mestre Adrover et al. |
| 10,880,197 B2 * | 12/2020 | Naskar .......... H04L 45/745 |
| 2001/0016867 A1 | 8/2001 | Hu et al. |
| 2002/0056100 A1 | 5/2002 | Shimomura et al. |
| 2002/0087282 A1 | 7/2002 | Millard |
| 2002/0105911 A1 | 8/2002 | Pruthi et al. |
| 2002/0138226 A1 | 9/2002 | Doane |
| 2002/0162059 A1 | 10/2002 | McNeeley et al. |
| 2002/0172205 A1 | 11/2002 | Fagore-Brage et al. |
| 2002/0184527 A1 | 12/2002 | Chun et al. |
| 2002/0184614 A1 | 12/2002 | Davia et al. |
| 2003/0009544 A1 | 1/2003 | Wach |
| 2003/0036897 A1 | 2/2003 | Flores et al. |
| 2003/0043434 A1 | 3/2003 | Brachmann et al. |
| 2003/0061506 A1 | 3/2003 | Cooper et al. |
| 2003/0069952 A1 | 4/2003 | Fams et al. |
| 2003/0139919 A1 | 7/2003 | Sher et al. |
| 2003/0154432 A1 | 8/2003 | Scott et al. |
| 2003/0182408 A1 | 9/2003 | Hu |
| 2003/0188003 A1 | 10/2003 | Sylvest et al. |
| 2003/0191590 A1 | 10/2003 | Narayan et al. |
| 2003/0231741 A1 | 12/2003 | Rancu et al. |
| 2004/0010787 A1 | 1/2004 | Traut et al. |
| 2004/0015600 A1 | 1/2004 | Tiwary et al. |
| 2004/0021678 A1 | 2/2004 | Ullah et al. |
| 2004/0111502 A1 | 6/2004 | Oates |
| 2004/0111519 A1 | 6/2004 | Fu et al. |
| 2004/0117474 A1 | 6/2004 | Ginkel et al. |

(56) References Cited

U.S. PATENT DOCUMENTS

| | | |
|---|---|---|
| 2004/0139437 A1 | 7/2004 | Arndt |
| 2004/0236866 A1 | 11/2004 | Dugatkin et al. |
| 2005/0021715 A1 | 1/2005 | Dugatkin et al. |
| 2005/0039180 A1 | 2/2005 | Fultheim et al. |
| 2005/0116920 A1 | 6/2005 | Park et al. |
| 2005/0216234 A1 | 9/2005 | Glas et al. |
| 2005/0268298 A1 | 12/2005 | Hunt et al. |
| 2006/0002305 A1 | 1/2006 | Ginzburg |
| 2006/0025985 A1 | 2/2006 | Vinberg et al. |
| 2006/0037002 A1 | 2/2006 | Vinberg et al. |
| 2006/0072543 A1 | 4/2006 | Lloyd et al. |
| 2006/0123416 A1 | 6/2006 | Cibrario Bertolotti et al. |
| 2006/0129847 A1 | 6/2006 | Pitsos |
| 2006/0224375 A1 | 10/2006 | Barnett et al. |
| 2007/0038744 A1 | 2/2007 | Cocks et al. |
| 2007/0067374 A1 | 3/2007 | Iketani et al. |
| 2007/0069005 A1 | 3/2007 | Dickerson et al. |
| 2007/0112549 A1 | 5/2007 | Lau et al. |
| 2007/0195776 A1 | 8/2007 | Zheng et al. |
| 2007/0213966 A1 | 9/2007 | Noble |
| 2007/0233453 A1 | 10/2007 | Ito et al. |
| 2007/0280243 A1 | 12/2007 | Wray et al. |
| 2007/0283347 A1 | 12/2007 | Bobroff et al. |
| 2008/0044018 A1 | 2/2008 | Scrimsher et al. |
| 2008/0163207 A1 | 7/2008 | Reumann et al. |
| 2008/0186968 A1* | 8/2008 | Farinacci ............ H04L 49/351 |
| | | 370/392 |
| 2008/0189700 A1 | 8/2008 | Schmidt et al. |
| 2008/0208554 A1 | 8/2008 | Igarashi |
| 2008/0221857 A1 | 9/2008 | Casotto |
| 2008/0244525 A1 | 10/2008 | Khalil et al. |
| 2009/0089038 A1 | 4/2009 | Nadgir et al. |
| 2009/0089781 A1 | 4/2009 | Shingai et al. |
| 2009/0119542 A1 | 5/2009 | Nagashima et al. |
| 2009/0259704 A1 | 10/2009 | Aharoni et al. |
| 2009/0287837 A1 | 11/2009 | Felsher |
| 2009/0300613 A1 | 12/2009 | Doi |
| 2009/0307530 A1 | 12/2009 | Tarta |
| 2009/0327784 A1 | 12/2009 | Shah et al. |
| 2010/0008305 A1 | 1/2010 | Yeo et al. |
| 2010/0111494 A1 | 5/2010 | Mazzaferri |
| 2010/0138920 A1 | 6/2010 | Kim et al. |
| 2010/0153055 A1 | 6/2010 | Mucha et al. |
| 2010/0153529 A1 | 6/2010 | Moser |
| 2010/0161864 A1 | 6/2010 | Barde et al. |
| 2010/0169882 A1 | 7/2010 | Ben-Yehuda et al. |
| 2010/0199275 A1 | 8/2010 | Mudigonda et al. |
| 2010/0235831 A1 | 9/2010 | Dittmer |
| 2010/0238923 A1 | 9/2010 | Cheon et al. |
| 2010/0241734 A1 | 9/2010 | Miyajima |
| 2010/0250824 A1 | 9/2010 | Belay |
| 2010/0299666 A1 | 11/2010 | Agbaria et al. |
| 2010/0317420 A1 | 12/2010 | Hoffberg |
| 2010/0325191 A1 | 12/2010 | Jung et al. |
| 2010/0332212 A1 | 12/2010 | Finkelman |
| 2011/0010515 A1 | 1/2011 | Ranade |
| 2011/0010691 A1 | 1/2011 | Lu et al. |
| 2011/0066786 A1 | 3/2011 | Colbert |
| 2011/0066819 A1 | 3/2011 | Mashtizadeh et al. |
| 2011/0116719 A1 | 5/2011 | Bilobrov |
| 2011/0125892 A1 | 5/2011 | Rajan et al. |
| 2011/0126193 A1 | 5/2011 | Mullin et al. |
| 2011/0176441 A1 | 7/2011 | Matsuoka |
| 2011/0197190 A1 | 8/2011 | Hattori et al. |
| 2011/0202917 A1 | 8/2011 | Laor |
| 2011/0239214 A1 | 9/2011 | Frields et al. |
| 2011/0246171 A1 | 10/2011 | Cleeton et al. |
| 2011/0307739 A1 | 12/2011 | El Mahdy et al. |
| 2012/0054409 A1 | 3/2012 | Block et al. |
| 2012/0054740 A1 | 3/2012 | Chakraborty et al. |
| 2012/0060167 A1 | 3/2012 | Salsburg et al. |
| 2012/0084487 A1 | 4/2012 | Barde |
| 2012/0102492 A1 | 4/2012 | Iwata |
| 2012/0106423 A1 | 5/2012 | Nylander et al. |
| 2012/0110181 A1* | 5/2012 | Tsirkin ................ G06F 9/4856 |
| | | 709/226 |
| 2012/0131576 A1 | 5/2012 | Hatta et al. |
| 2012/0159473 A1 | 6/2012 | Tsirkin |
| 2012/0192182 A1 | 7/2012 | Hayward et al. |
| 2012/0246644 A1 | 9/2012 | Hattori et al. |
| 2012/0284709 A1 | 11/2012 | Lorenc et al. |
| 2012/0290703 A1 | 11/2012 | Barabash et al. |
| 2012/0290766 A1 | 11/2012 | Oshins |
| 2012/0311387 A1 | 12/2012 | Santhosh et al. |
| 2012/0317555 A1 | 12/2012 | Aluru et al. |
| 2012/0317566 A1 | 12/2012 | Santos et al. |
| 2013/0013107 A1* | 1/2013 | Felique ................ G07F 9/006 |
| | | 700/244 |
| 2013/0013657 A1 | 1/2013 | Emelko et al. |
| 2013/0019242 A1 | 1/2013 | Chen et al. |
| 2013/0036416 A1 | 2/2013 | Raju et al. |
| 2013/0055026 A1 | 2/2013 | Hatano et al. |
| 2013/0080999 A1 | 3/2013 | Yang |
| 2013/0139154 A1 | 5/2013 | Shah |
| 2013/0139155 A1 | 5/2013 | Shah |
| 2013/0139173 A1 | 5/2013 | Carter |
| 2013/0152083 A1 | 6/2013 | Miki et al. |
| 2013/0159021 A1 | 6/2013 | Felsher |
| 2013/0159650 A1 | 6/2013 | Wakamiya |
| 2013/0179879 A1 | 7/2013 | Zhang et al. |
| 2013/0227551 A1 | 8/2013 | Tsirkin |
| 2013/0238802 A1 | 9/2013 | Sarikaya |
| 2013/0247056 A1 | 9/2013 | Hattori et al. |
| 2013/0263118 A1 | 10/2013 | Kannan et al. |
| 2013/0275592 A1 | 10/2013 | Xu et al. |
| 2013/0282354 A1 | 10/2013 | Sayers et al. |
| 2013/0283265 A1 | 10/2013 | Acharya et al. |
| 2013/0288668 A1 | 10/2013 | Pragada et al. |
| 2013/0297769 A1 | 11/2013 | Chang et al. |
| 2013/0318528 A1 | 11/2013 | Hirose |
| 2013/0325433 A1 | 12/2013 | Albano et al. |
| 2013/0326175 A1 | 12/2013 | Tsirkin |
| 2013/0339956 A1 | 12/2013 | Murase et al. |
| 2013/0346987 A1 | 12/2013 | Raney et al. |
| 2014/0006358 A1 | 1/2014 | Wang et al. |
| 2014/0013306 A1 | 1/2014 | Gounares et al. |
| 2014/0047125 A1 | 2/2014 | Hyoudou et al. |
| 2014/0047272 A1 | 2/2014 | Breternitz et al. |
| 2014/0052852 A1 | 2/2014 | Dufour et al. |
| 2014/0067940 A1 | 3/2014 | Li et al. |
| 2014/0068335 A1 | 3/2014 | Bromley et al. |
| 2014/0081615 A1 | 3/2014 | Abdirashid et al. |
| 2014/0108001 A1 | 4/2014 | Brown et al. |
| 2014/0109051 A1 | 4/2014 | McDonald et al. |
| 2014/0160961 A1 | 6/2014 | Dragulescu et al. |
| 2014/0223431 A1 | 8/2014 | Yoshimura et al. |
| 2014/0229605 A1 | 8/2014 | Besser |
| 2014/0229781 A1 | 8/2014 | Whetsel |
| 2014/0229945 A1 | 8/2014 | Barkai et al. |
| 2014/0269709 A1 | 9/2014 | Benny et al. |
| 2014/0282425 A1 | 9/2014 | Zhao et al. |
| 2014/0289418 A1 | 9/2014 | Cohen et al. |
| 2014/0298335 A1 | 10/2014 | Regev et al. |
| 2014/0317293 A1 | 10/2014 | Shatzkamer |
| 2014/0317600 A1 | 10/2014 | Klunder et al. |
| 2014/0317625 A1 | 10/2014 | Ichikawa et al. |
| 2014/0321285 A1 | 10/2014 | Chew et al. |
| 2014/0378057 A1 | 12/2014 | Ramon et al. |
| 2015/0007174 A1 | 1/2015 | Jain |
| 2015/0029848 A1 | 1/2015 | Jain |
| 2015/0046141 A1 | 2/2015 | Lahiri et al. |
| 2015/0063166 A1 | 3/2015 | Sif et al. |
| 2015/0100958 A1 | 4/2015 | Banavalikar et al. |
| 2015/0120797 A1 | 4/2015 | Roy et al. |
| 2015/0135178 A1 | 5/2015 | Fischer et al. |
| 2015/0140956 A1* | 5/2015 | Prewitt, II ............ H04M 3/362 |
| | | 455/405 |
| 2015/0234725 A1 | 8/2015 | Cillis et al. |
| 2015/0236936 A1 | 8/2015 | Waldbusser |
| 2015/0293826 A1 | 10/2015 | Sincan et al. |
| 2015/0317169 A1 | 11/2015 | Sinha et al. |
| 2015/0332357 A1 | 11/2015 | McBride et al. |
| 2015/0333979 A1 | 11/2015 | Schwengler et al. |

(56) References Cited

U.S. PATENT DOCUMENTS

| | | | |
|---|---|---|---|
| 2015/0334030 A1 | 11/2015 | Vasseur et al. | |
| 2015/0365288 A1* | 12/2015 | Van Der Merwe | G06Q 10/06 370/254 |
| 2016/0006844 A1 | 1/2016 | Tychina | |
| 2016/0034289 A1 | 2/2016 | Amano et al. | |
| 2016/0034372 A1 | 2/2016 | Panda et al. | |
| 2016/0062781 A1 | 3/2016 | Tsirkin et al. | |
| 2016/0110211 A1 | 4/2016 | Karnes | |
| 2016/0147987 A1 | 5/2016 | Jang et al. | |
| 2016/0191545 A1 | 6/2016 | Nanda et al. | |
| 2016/0232019 A1 | 8/2016 | Shah et al. | |
| 2016/0248858 A1 | 8/2016 | Qiu et al. | |
| 2016/0323243 A1 | 11/2016 | LeVasseur et al. | |
| 2016/0352578 A1 | 12/2016 | Chen et al. | |
| 2017/0024308 A1 | 1/2017 | Knoulich | |
| 2017/0026806 A1 | 1/2017 | Jampani et al. | |
| 2017/0048110 A1 | 2/2017 | Wu et al. | |
| 2017/0085459 A1 | 3/2017 | Xia et al. | |
| 2017/0094002 A1 | 3/2017 | Kumar et al. | |
| 2017/0099195 A1 | 4/2017 | Raney | |
| 2017/0099197 A1 | 4/2017 | Raney | |
| 2017/0118102 A1 | 4/2017 | Majumder et al. | |
| 2017/0126588 A1* | 5/2017 | Anand | H04L 49/70 |
| 2017/0141974 A1 | 5/2017 | Lahiri | |
| 2017/0163510 A1 | 6/2017 | Arora et al. | |
| 2017/0214694 A1 | 7/2017 | Yan | |
| 2017/0295084 A1 | 10/2017 | Ramanath et al. | |
| 2019/0222481 A1* | 7/2019 | Hira | H04L 43/10 |
| 2019/0372881 A1 | 12/2019 | Hu et al. | |
| 2020/0021512 A1 | 1/2020 | Naskar et al. | |
| 2020/0028772 A1* | 1/2020 | Laslau | H04L 41/145 |
| 2020/0112524 A1 | 4/2020 | Sindhu et al. | |
| 2020/0133688 A1* | 4/2020 | Shinde | G06F 9/45558 |
| 2020/0195519 A1 | 6/2020 | Di Martino | |
| 2020/0296023 A1* | 9/2020 | Kumar | H04L 43/103 |
| 2020/0313999 A1 | 10/2020 | Lee et al. | |
| 2020/0366588 A1 | 11/2020 | Bergeron | |
| 2020/0412607 A1 | 12/2020 | Guan et al. | |

FOREIGN PATENT DOCUMENTS

| | | | |
|---|---|---|---|
| EP | 3895375 | A2 | 2/1999 |
| EP | 3046288 | A1 | 7/2016 |
| EP | 3110106 | A1 | 12/2016 |
| EP | 3119034 | A1 | 1/2017 |
| GB | 2565673 | A | 2/2019 |
| JP | 1620103 | B2 | 1/2011 |
| WO | 32056541 | A2 | 7/2002 |
| WO | 2011002578 | A1 | 1/2011 |
| WO | 2014030061 | A2 | 2/2014 |
| WO | 2014160660 | A1 | 10/2014 |
| WO | 2015023369 | A1 | 2/2015 |
| WO | 2017083024 | A1 | 5/2017 |
| WO | 2017176455 | A1 | 10/2017 |
| WO | 2021015802 | A1 | 1/2021 |

OTHER PUBLICATIONS

Communication under Rule 71(3) EPC Intention to Grant for European Patent Application Serial No. 14 774 774.5 (dated May 20, 2019).

Communication pursuant to Article 94(3) EPC for European Patent Application Serial No. 14 774 774.5 (dated Nov. 6, 2018).

Advisory Action, Examiner-Initiated Interview Summary, and AFCP 2.0 Decision for U.S. Appl. No. 15/092,575 (dated Sep. 6, 2018).

Decision to grant a European patent pursuant to Article 97(1) EPC for European Patent Application Serial No. 14836839.2 (dated Jul. 26, 2018).

Final Office Action for U.S. Appl. No. 15/092,575 (dated Jun. 15, 2018).

Applicant-Initiated Interview Summary for U.S. Appl. No. 15/092,575 (dated Mar. 27, 2018).

Office Action for U.S. Appl. No. 15/092,575 (dated Dec. 15, 2017).

Notification of Transmittal of the International Search Report and the Written Opinion of the International Searching Authority, or the Declaration for International Application No. PCT/US2017/023625 (dated Jun. 13, 2017).

Notice of Allowance and Examiner Initiated Interview Summary for U.S. Appl. No. 14/224,024 (dated Jun. 6, 2017).

Communication of the extended European search report for European Application No. 14836839.2 (dated Feb. 10, 2017).

Non-Final Office Action for U.S. Appl. No. 14/224,024 (dated Jan. 10, 2017).

Communication of the extended European search report for European Patent Application No. 14774774.5 (dated Nov. 23, 2016).

Advisory Action for U.S. Appl. No. 14/224,024 (dated Sep. 27, 2016).

Notice of Allowance and Fee(s) Due for U.S. Appl. No. 14/251,547 (dated Aug. 23, 2016).

Notice of Allowance and Fee(s) Due for U.S. Appl. No. 13/969,085 (dated Aug. 10, 2016).

Notice of Allowance and Fee(s) Due for U.S. Appl. No. 14/749,606 (dated Jul. 27, 2016).

Applicant-Initiated Interview Summary for U.S. Appl. No. 14/224,024 (dated Jul. 18, 2016).

Final Office Action for U.S. Appl. No. 14/224,024 (dated Jun. 15, 2016).

Applicant-Initiated Interview Summary for U.S. Appl. No. 13/969,085 (dated Jun. 7, 2016).

Kim et al., "In-band Network Telemetry (INT)," pp. 1-28 (Jun. 2016).

Communication of European publication number and information on the application of Article 67(3) EPC for European Application No. 14836839.2 (dated May 25, 2016).

Applicant-Initiated Interview Summary for U.S. Appl. No. 14/224,024 (dated May 13, 2016).

Notice of Allowance and Fee(s) Due for U.S. Appl. No. 14/445,921 (dated May 12, 2016).

Final Office Action for U.S. Appl. No. 13/969,085 (dated Apr. 19, 2016).

Non-Final Office Action for U.S. Appl. No. 14/251,547 (dated Apr. 26, 2016).

Applicant-Initiated Interview Summary for U.S. Appl. No. 14/445,921 (dated Apr. 14, 2016).

Non-Final Office Action for U.S. Appl. No. 14/224,024 (dated Feb. 3, 2016).

Corrected Notice of Allowability for U.S. Appl. No. 14/158,659 (dated Jan. 11, 2016).

Communication of European publication number and information on the application of Article 67(3) EPC for European Application No. 14774774.5 (dated Jan. 7, 2016).

Notice of Allowance and Fee(s) Due for U.S. Appl. No. 14/158,659 (dated Dec. 11, 2015).

Non-Final Office Action for U.S. Appl. No. 14/445,921 (dated Jan. 14, 2016).

Non-Final Office Action for U.S. Appl. No. 13/969,085 (dated Sep. 24, 2015).

"IxVM: Validating Virtualized Assets and Environments," Ixia, Data Sheet, pp. 1-8, (Jun. 2015).

Notification of Transmittal of the International Search Report and the Written Opinion of the International Searching Authority, or the Declaration for PCT International Application No. PCT/US2014/045658 (dated Oct. 30, 2014).

Notification of Transmittal of the International Search Report and the Written Opinion of the International Searching Authority, or the Declaration for PCT International Application No. PCT/US2014/031637 (dated Jul. 31, 2014).

"Fisher-Yates Shuffle," http://en.wikipedia.org/wiki/Fisher-Yates_shuffle, pp. 1-11 (May 8, 2014).

"IxLoad: Specifications," https://web.archive.org/web/20130901094417/http://www.ixiacom.com/products/network_test/applications/ixload/specifications/index.php, pp. 1-5 (Sep. 1, 2013).

"ImpairNet™—EIM1G4S, EIM10G4S, and EIM40G2Q Ethernet Impairment Load Module," pp. 1-5 (Jul. 2013).

"IxLoad" Ixia, Solution Brief, pp. 1-4 (Feb. 2012).

(56) References Cited

OTHER PUBLICATIONS

Martigoni et al., "Testing System Virtual Machines," ISSTA'10, pp. 1-11 (2010).
Liu et al., "Live Migration of Virtual Machine Based on Full System Trace and Replay," Services Computing Technology and System Lab, Huazhong University of Science and Technology, pp. 101-110 (2009).
Sommers and Barford, "Self-Configuring Network Traffic Generation", IMC'04, pp. 1-14 (Oct. 25-27, 2004).
Examination Report for Great Britain Application Serial No. GB1817757.6 (dated May 28, 2021).
Office Action for Chinese Patent Application Serial No. 2021051802456380 (dated May 21, 2021).
Giotis et al., "Policy-based Orchestration of NFV Services in Software-Defined Networks," IEEE, pp. 1-5 (2015).
Xia et al., "Resource Optimization for Service Chain Monitoring in Software-Defined Networks," Fourth European Workshop on Software Defined Networks, IEEE, pp. 1-6 (2015).
"Networking/SAI," Open Compute, pp. 1-6 (Oct. 2020).
Han et al., "Virtualization in Programmable Data Plane: A Survey and Open Challenges," IEEE Open Journal of the Communications Society, pp. 1-7 (2020).
Byagowi et al., "Bringing the F16 Network into the Lab," OCP Global Summit, pp. 1-16 (2020).
Siron, "What is the Hyper-V Virtual Switch and How Does it Work?" Altaro, pp. 1-22 (Sep. 26, 2019).
Zhang et al., "MPVisor: A Modular Programmable Data Plane Hypervisor," SOSR' 17, pp. 1-2 (Apr. 3-4, 2017).
Khalidi, "SONiC: The networking switch software that powers the Microsoft Global Cloud," Blog(/en-us/blog/) Cloud Strategy, pp. 1-10 (Mar. 8, 2017).
Zhang et al., "HyperV: A High Performance Hypervisor for Virtualization of the Programmable Data Plane," 2017 26th International Conference on Computer Communication and Networks (ICCCN), pp. 1-9 (2017).
Cziva et al., "High-Performance Virtualized SDN Switches for Experimental Network Testbeds," SI:SC16—INDIS, pp. 1-14 (Nov. 8, 2016).
Advisory Action, Examiner-Initiate Interview Summary, and AFCP 2.0 Decision for U.S. Appl. No. 16/039,283 (dated Mar. 30, 2021).
Communication under Rule 71(3) EPC Intention to Grant for European Patent Application Serial No. 16 864 727.9 (dated Feb. 18, 2021).
Non-Final Office Action for U.S. Appl. No. 17/069,768 (dated Feb. 4, 2021).
Final Office Action for U.S. Appl. No. 16/039,283 (dated Dec. 31, 2020).
Non-Final Office Action for U.S. Appl. No. 16/039,283 (dated Jul. 8, 2020).
Communication pursuant to Article 94(3) EPC for European Application Serial No. 16 864 727.9 (dated May 4, 2020).
Notice of Allowance and Fee(s) Due and Examiner-Initiated Interview Summary for U.S. Appl. No. 14/939,674 (dated Jul. 13, 2018).
Advisory Action and AFCP 2.0 Decision for U.S. Appl. No. 14/939,674 (dated May 4, 2018).
Final Office Action for U.S. Appl. No. 14/939,674 (dated Feb. 9, 2018).
Corrected Notice of Allowability for U.S. Appl. No. 14/960,865 (dated Feb. 7, 2018).
Notice of Allowance and Fee(s) Due for U.S. Appl. No. 14/960,865 (dated Jan. 2, 2018).
Non-Final Office Action for U.S. Appl. No. 14/939,674 (dated Sep. 21, 2017).
Non-Final Office Action for U.S. Appl. No. 14/960,865 (dated Apr. 21, 2017).
Notice of Allowance and Fee(s) Due & Examiner-Initiated Interview Summary for U.S. Appl. No. 13/765,628 (dated Jan. 10, 2017).
Notification of Transmittal of the International Search Report and the Written Opinion of the International Searching Authority, or the Declaration for International Application No. PCT/US2016/054163 (dated Jan. 5, 2017).
Advisory Action and Examiner Initiated Interview Summary for U.S. Appl. No. 13/765,628 (dated Oct. 17, 2016).
Final Office Action for U.S. Appl. No. 13/765,628 (dated Jul. 27, 2016).
"Virtual Taps," Net Optics: Architecting Visibility Into Your Netowrk, p. 1-5 (accessed Jun. 30, 2016).
"Network function virtualization," https://en.wikipedia.org/wiki/Network_function_virtualization, pp. 1-7 (Nov. 23, 2015).
"Software-defined networking," https://en.wikipedia.org/wiki/Software-defined_networking, pp. 1-9 (Nov. 13, 2015).
"Ixia Phantom vTap with TapFlow Filtering," Ixia Data Sheet, Document No. 915-6805-01 Rev K, pp. 1-4 (Jul. 2015).
Non-Final Office Action for U.S. Appl. No. 13/765,628 (dated Dec. 1, 2014).
Non-Final Office Action for U.S. Appl. No. 17/198,870 (dated Sep. 17, 2021).
Zhou et al., "HyperTester: High-performance Network Testing Driven by Programmable Switches," In The 15th International Conference on emerging Networking Experiments and Technologies (CoNEXT '19), pp. 1-14 (Dec. 9-12, 2019).
Spirent Communications, "Cloud Computing Testing," pp. 1-10 (Apr. 2010).
Intention to Grant under Section 18(4) for Great Britain Application Serial No. 1817757.6 (dated Aug. 18, 2021).
Advisory Action for U.S. Appl. No. 17/069,768 (dated Sep. 28, 2021).
"Spirent Network Emulator," Spirent Communications, pp. 1-11 (Apr. 2021).
"Ethernet Network Emulator," MGA2510 Product Brief, Aukua Systems, pp. 1-2 (2021).
"Chimera Network Impairment Emulator," Xena Networks, pp. 1-2 (2021).
Commonly-Assigned, co-pending U.S. Appl. No. 17/542,011 for "Methods, Systems, and Computer Readable Media for Providing Adaptive Background Test Traffic in a Test Environment." (Unpublished, filed Dec. 3, 2021).
Commonly-Assigned, co-pending U.S. Appl. No. 17/498,723 for "Methods, Systems, and Computer Readable Media for Recycling Background Traffic in a Test Environment," (Unpublished, filed Oct. 11, 2021).
Cao et al., "TurboNet: Faithfully Emulating Networks with Programmable Switches," IEEE, pp. 1-11 (2020).
"Datasheet—Albedo Net.Storm," Albedo Telecom, pp. 1-2 (Dec. 23, 2015).
"Albedo Net.Storm," NETSTORM.en, pp. 1-4 (2014).
Tos et al., "Adaptive RTP Rate Control Method," 2011 35th IEEE Annual Computer Software and Applications Conference Workshops, pp. 1-6 (2011).
Mittal et al., "Dynamic Simulation Control with Queue Visualization," Summer Computer Simulation Conference, pp. 1-7 (Jun. 2005).
Notification of the Decision to Grant a Patent Right for Patent for Invention for Chinese Patent Application Serial No. 201680065423.9 (dated Oct. 11, 2021).
"TekExpress USB 3.0 (USB-RMT) Automated Receiver Compliance and Margin Test Solutions," Tektronix, pp. 1-154.
"QSFP DD Loopback Modules," High Speed IO, Amphenol ICC, pp. 1-2 (2021).
Sultana et al., "Flightplan Dataplane Disaggregation and Placement for P4 Programs," 18th {USENIX} Symposium on Networked Systems Design and Implementation, pp. 1-22 (2021).
"Agilent E4219A ATM Network Impairment Emulator," Keysight, pp. 1-5 (2021).
"Network Emulator II—Ethernet 10GE, 1GE, and 100MbE Ethernet Impairment Emulation," Keysight Technologies, pp. 1-8 (Oct. 22, 2020).
"The Value of Network Impairment Testing in Power Grids," Calnex SNE, pp. 1-2 (2006).

(56) References Cited

OTHER PUBLICATIONS

Non-Final Office Action for U.S. Appl. No. 16/039,283 (dated Jul. 22, 2021).
Final Office Action for U.S. Appl. No. 17/069,768 (dated Jul. 9, 2021).
Decision to grant a European patent pursuant to Article 97(1) EPC for European Patent Application Serial No. 16864727.9 (dated Jul. 1, 2021).

* cited by examiner

300

| TOPOLOGY ID (TID) | TOPOLOGY DESCRIPTION |
|---|---|
| TOP_1 | 3-stage clos - [a,b,c] switches at each layer, x,y,z speeds and feeds |
| TOP_2 | 3-stage clos - [a,b,c,d] switches at each layer, x,y,z speeds and feeds |
| TOP_3 | 5-stage clos - [a,b,c] switches at each layer, v,x,y speeds and feeds |
| TOP_4 | 3-stage clos - [a,b,c] switches at PODSW, [d,e] at TORSW, [f] at SPSW, x speeds and feeds at PODSW, y speeds and feeds at TORSW, z speeds and feeds at SPSW |

| TID | ESID | LOGICAL PORT | PSID | PHYSICAL PORT |
|---|---|---|---|---|
| TOP_1 | TORSW1 | 1 | SW1 | 47 |
| TOP_1 | TORSW1 | 2 | SW1 | 14 |
| TOP_1 | TORSW1 | 3 | SW1 | 35 |
| TOP_1 | TORSW2 | 1 | SW1 | 22 |
| TOP_1 | TORSW2 | 5 | SW1 | 77 |
| TOP_1 | TORSW2 | 7 | SW1 | 62 |
| ... | ... | ... | ... | ... |
| TOP_1 | TORSW2 | 6 | SW1 | 33 |
| TOP_4 | TORSW3 | 2 | SW1 | 60 |
| TOP_4 | TORSW3 | 3 | SW1 | 26 |
| TOP_4 | TORSW3 | 4 | SW1 | 37 |
| TOP_4 | TORSW4 | 1 | SW1 | 18 |
| TOP_4 | TORSW4 | 3 | SW1 | 22 |
| TOP_4 | TORSW4 | 5 | SW1 | 23 |

FIG. 4

METHODS, SYSTEMS, AND COMPUTER READABLE MEDIA FOR NETWORK TESTING USING SWITCH EMULATION

TECHNICAL FIELD

The subject matter described herein relates to network testing. More specifically, the subject matter relates to methods, systems, and computer readable media for network testing using switch emulation.

BACKGROUND

Data center environments typically provide high reliability and security and typically include networked resources (e.g., virtual or physical servers connected via network switches) sharable by multiple clients of the data center operator. Large data centers are industrial scale operations using as much electricity as a small town. Various data centers may utilize virtualization. For example, a data center may implement multiple virtual machines (VMs) that communicate via a virtual switch (vSwitch), e.g., virtual servers, using a physical CPU-based server or node in the data center. In this example, each VM may execute an operating system and other software, where each VM may appear as a physical server to end users.

It will be appreciated that an emulated switch of the type described in this disclosure is distinctly different from the entity referred to commonly in the industry as a virtual switch. More particularly, a virtual switch is a software application that runs on top of central processing unit (CPU), which allows communication between virtual machines, where the virtual machines are administered by a virtual machine hypervisor. A vSwitch does not subdivide and allocate resources of an underlying physical switch ASIC chip into multiple emulated switches, but instead creates a software representation of a completely virtual switch (i.e., there is no mapping to underlying physical switch ASIC hardware).

When testing data center equipment, it is important to make sure that testing mimics real world scenarios and conditions. For example, when testing a data center server or related applications, it may be necessary to mimic or emulate resources in the data center.

Accordingly, a need exists for methods, systems, and computer readable media for network testing using switch emulation.

SUMMARY

Methods, systems, and computer readable media for network testing using switch emulation are disclosed. According to one method, the method occurs at a network test system implemented using at least one processor. The method includes receiving configuration information for configuring a network testing scenario comprising an emulated switching environment, wherein the configuration information includes topology information defining the emulated switching environment; configuring, using the configuration information, the emulated switching environment including allocating, using a switch application-specific integrated circuit (ASIC) resource allocator, resources of at least one physical ASIC switch to multiple emulated switches; and configuring, using the configuration information, a test session for testing a system under test (SUT) using the emulated switching environment and a network visibility infrastructure for obtaining performance information associated with the test session.

According to one system, the system includes a network test system implemented using at least one processor. The network test system is configured for: receiving configuration information for configuring a network testing scenario comprising an emulated switching environment, wherein the configuration information includes topology information defining the emulated switching environment; configuring, using the configuration information, the emulated switching environment including allocating, using a switch application-specific integrated circuit (ASIC) resource allocator, resources of at least one physical ASIC switch to multiple emulated switches; and configuring, using the configuration information, a test session for testing a system under test (SUT) using the emulated switching environment and a network visibility infrastructure for obtaining performance information associated with the test session.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which:

FIG. 3 is a diagram illustrating example switching topology configuration information;

FIG. 4 is a diagram illustrating example port mapping data for mapping emulated switch ports to physical switch ports.

DETAILED DESCRIPTION

Figure 1:
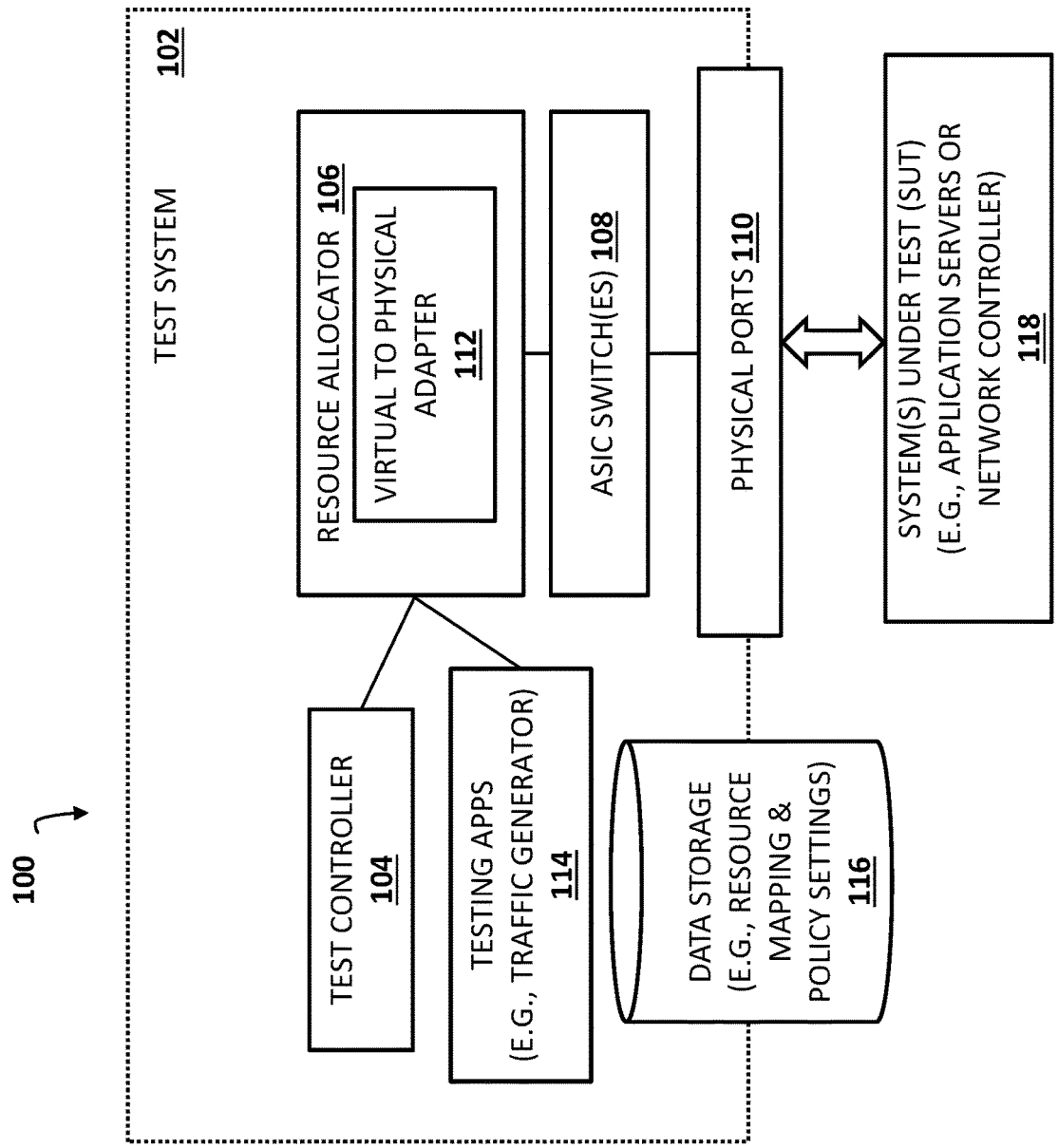
FIG. 1 is a diagram illustrating an environment for network testing using switch emulation.

The subject matter described herein includes methods, systems, and computer readable media for network testing using switch emulation.

In accordance with some aspects of the subject matter described herein, a test system (e.g., one or more computing platforms, devices, or nodes) may be configured to emulate a switching environment, such as virtual networking resources and/or other data center related resources, by using a switch ASIC resource and/or one or more physical switches. It will be appreciated that some embodiments include one or more emulated switches, where an emulated switch is a logically allocated portion of a physical switch ASIC that is made to look like an independent logical switch device to the environment (e.g., a DUT, SUT, or controller) by using a switch ASIC resource allocator. In some embodiments, the SARA is adapted to facilitate collection and reporting of emulated logical switch performance metric information (e.g., emulated logical switch queue depth, emulated logical switch latency, etc.) during a test run or session by a visibility module.

For example, a test system or a switch ASIC resource allocator in accordance with the disclosure herein may be configured to maintain state information and/or port mapping information associated with at least one or more emulated switches. In this example, a network management system (NMS), a network operating system (NOS), a software-defined network (SDN) controller, or other control entity may send, to a test system, a configuration request for configuring a set of available switches or other aspects of an emulated switching environment or a data center environment. Continuing with this example, assuming the configuration request is for configuring a port speed for a virtual port 'v1' on an emulated switch 'TORSW3' of a test system, a switch ASIC resource allocator of the test system may receive the configuration request and may generate and send, to a physical application-specific integrated circuit (ASIC) switch or a related controller, a corresponding physical switch configuration request for configuring a corresponding physical port '34' on the physical ASIC switch.

In accordance with some aspects of the subject matter described herein, a test system may be configured to efficiently test network configurations by monitoring and/or analyzing various performance aspects of a SUT associated with an emulated switching environment. For example, an example test system described herein may be configured to emulate a data center environment comprising a multi-stage switching network comprising top-of-rack (TOR) switches, fabric or pod switches, and spine switches. In this example, the computing platform may utilize a switch ASIC resource allocator and/or a logical emulation layer to allocate physical switch ports and/or other physical resources to one or more emulated switches. Continuing with this example, the test system or a switch ASIC resource allocator may store related emulation information in one or more data structures for translating communications (e.g., configuration commands or usage report requests) involving virtual and physical resources. In some embodiments, a data structure for switch ASIC emulation may include emulated switch port to physical switch port mappings, emulated topology settings involving emulated switches (e.g., their relative locations (e.g., tiers or stages) and related connectivity), emulated switch telemetry and/or visibility characteristics, emulated link and/or port speeds, etc.

In accordance with some aspects of the subject matter described herein, emulating a data center or switching environment using a test system (e.g., single computing platform or device) may involve allocating (e.g., statically, semi-statically, or dynamically) to each virtual or emulated switch a subset of "front-panel" traffic ports of the test system for links to a SUT (e.g., servers or hosts that utilize switching fabric services) and for links connecting emulated switches. In some embodiments, depending upon the implementation, external cables may not be required to realize switch-to-switch links because internal loopback interfaces and related ASIC pipeline configuration can obviate the need for external cabling.

In accordance with some aspects of the subject matter described herein, emulating a data center or switching environment can allow a SUT (e.g., a NMS, a software defined network controller, or other entity) to access the emulated environment as if it consisted of multiple separate devices, each with their own resources such as traffic ports, buffers/queues, lookup tables, etc. In some embodiments, such emulation can eliminate or reduce the need for the SUT or a testing application to understand the details of the implementation and without requiring the SUT or the testing application to translate emulated switch information to resources of an underlying physical switch and without requiring the SUT or the testing application to monitor control-plane information of emulated switch by using knowledge of an underlying physical switch's resources.

By utilizing port mapping and other switch ASIC emulation information, an example test system can provide switch ASIC emulation using resources of one or more physical ASIC switches. For example, a test system may emulate a data center environment or a switching environment comprising multiple emulated switches and having different topologies and characteristics. Hence, a test system in accordance with the present disclosure can test a NOS, an NMS, and/or another entity or group of entities (e.g., application servers) that interact with the emulated switching or data center environment.

In some embodiments, a test system is adapted to include a traffic generator module for generating test traffic that is directed to flow through emulated logical switches or an emulated data center fabric. The emulated logical switch fabric may be configured so as to emulate a particular data center switching fabric. In some embodiments, the traffic generator module may include one or more test traffic receivers (e.g., test Rx ports) that are adapted to receive the test traffic and generate test metric information, which may be accessible to a visibility module of the test system. In some embodiments, the test traffic may transit the emulated data center switch fabric without being received or transiting the DUT/SUT. In such embodiments, generated test traffic may effectively serve as background traffic within the emulated data center switch fabric. In other embodiments, the test traffic may transit the emulated data center fabric and may be received and/or processed by the DUT/SUT.

In some embodiments, a visibility module is adapted to obtain emulated logical switch performance metric information associated with a DUT/SUT test by polling the SARA. As such, the test system allows a test system user to observe how the operation of a DUT/SUT impacts the emulated data center fabric during a test. The test also allows a test system user to observe how conditions (e.g., background traffic levels) in the emulated data center fabric impact the DUT/SUT during a test.

In some embodiments, a visibility module is adapted to obtain or generate telemetry or operational performance data associated with the emulated switches during the execution of a DUT/SUT test. In such embodiments, the visibility module may correlate this data with DUT/SUT endpoint operational activities and events (e.g., DUT/SUT operational actions defined in a test case) and may report performance data and/or correlated DUT/SUT endpoint information to the test system user.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating a computing environment 100 for network testing using switch emulation. Computing environment 100 may include one or more networks and/or one or more computer platforms, nodes, or devices. Referring to FIG. 1, computing environment 100 may include a test system 102 and/or a SUT 118.

Test system 102 may represent any suitable entity or entities (e.g., one or more computing platforms, nodes, or devices) associated with testing SUT 118 (e.g., one or more application servers, a network controller, or a NMS). For example, test system 102 may generate and send traffic to SUT 118 and/or receive traffic from SUT 118 and may analyze one or more performance aspects associated with SUT 118.

SUT 118 may be any suitable entity or entities (e.g., devices, systems, or platforms) for receiving, processing, forwarding, and/or sending one or more messages (e.g., packets). In some embodiments, SUT 118 may include one or more portions. For example, each portion of SUT 118 may include a network node, a network switch, a network router, a network interface card, a packet forwarding device, or one or more virtual network functions (VNF). In this example, each portion of SUT 118 or a VNF thereof may be software in a virtual container or machine (VC/M) executing on shared resources (e.g., compute, storage, and network resources in a cloud computing environment). In some embodiments, each portion of SUT 118 or a VNF thereof may include processing logic (e.g., rules associated with packet forwarding/processing) that is independent or separate from another portion of SUT 118 or another VNF.

In some embodiments, test system 102 may include a stand-alone tool, a testing device, a network equipment test device or platform, or software executing on one or more processor(s). In some embodiments, test system 102 may be a single device or node or may be distributed across multiple devices or nodes. In some embodiments, test system 102 may include one or more modules for performing various test related functions. For example, test system 102 may include a traffic (e.g., packet) generator for generating test traffic and/or testing related applications (e.g., a test analyzer or test configuration manager) for testing SUT 118.

Test system 102 may include a test controller (TC) 104, switch ASIC resource allocator (SARA) 106, physical ASIC switch(es) 108, ports 110, testing applications 114, and data storage 116. TC 104 may be any suitable entity or entities (e.g., software executing on a processor, a field-programmable gateway array (FPGA), and/or an ASIC, or a combination of software, an FPGA, and/or an ASIC) for performing one or more aspects associated with testing SUT 118 and/or various aspects thereof. In some embodiments, TC 104 may be implemented using one or more processors and/or memory. For example, TC 104 may utilize one or more processors (e.g., executing software stored in memory) to generate traffic patterns or scenarios for various message streams (e.g., flows or sessions). In another example, TC 104 may also utilize one or more processors to perform or initiate various tests and/or analyses involving test packets and/or related responses from SUT 118. In this example, TC 104 may send instructions to various modules or entities, e.g., testing applications 114, in test system 102 for controlling (e.g., to pause, (re)start, or stop) a test session.

In some embodiments, TC 104 may utilize out-of-band and/or in-band ports and/or interfaces for communicating with entities of test system 102. For example, in embodiments where TC 104 is external to SARA 106, TC 104 may communicate with SARA 106 via a management port or related interface.

In some embodiments, TC 104 may interact with one or more testing applications 114. Testing applications 114 may represent software for configuring test system 102 or portions thereof. In some embodiments, testing applications 114 can include, but are not limited to, visibility applications, SDN controller applications, GUI and CLI applications, and test traffic generation applications for communicating with SUT 118 and/or an emulated switching environment implemented using ASIC switch(es) 108.

In some embodiments, test system 102 or aspects thereof may be controlled or defined using one or more user-definable data models. For example, test system 102 may provide a GUI to allow a user to configure or modify a switch ASIC resource allocator model, a switching model, a data center emulation or switching topology model, a traffic generator model, a network visibility model, etc. In this example, high-level or user-definable data models may be converted into lower-level data models or into computer readable instructions for implementing the user-definable data models, e.g., implementing a data center emulation model on ASIC switch(es) 108.

In some embodiments, testing applications 114 may include or utilize one or more user interfaces for receiving settings and/or configuration information for setting up a testing scenario or a related test session. For example, a user interface may include any interface usable by one or more types of user (e.g., a human or another entity like an application, a machine, or a device) to interact with test system 102 or related entities. In some embodiments, one or more user interfaces may support automation e.g., via one or more programming languages (e.g., python), a representation state transfer (REST) API, a remote procedure call API (e.g., gRPC API), a command line interface (CLI), a machine-to-machine (M2M) automation interface, and/or a web based GUI. For example, a test operator may use a web browser to interact with a web based GUI associated with TC 104 and/or testing applications 114 for programming or configuring one or more aspects for testing SUT 118. In another example, a network controller may utilize a M2M automation interface for programming or configuring one or more aspects for testing SUT 118.

In some embodiments, testing applications 114 may include or utilize a GUI or other user interface for selecting and/or configuring emulated switching environments and/or other related settings (e.g., test reporting and/or network visibility settings). For example, testing applications 114 may include a web based GUI for obtaining a test operator or another entity's intent for setting up or configuring testing scenarios and/or related emulated switching environments. In this example, the GUI can be used to visually describe a topology comprising one or more emulated switches and/or to indicate particular physical resources to allocate to each emulated switch. In another example, the GUI can be used to gather test session settings and/or other information.

In some embodiments, from an end user perspective, a test system related user interface may provide and/or receive configuration settings for emulated switches associated with an emulated data center environment. In such embodiments, a user can use the user interface to configure a specific data center environment in which SUT 118 will operate or interact with and can monitor performance of both SUT 118 and the performance of the emulated switches that comprise the emulated data center environment.

In some embodiments, testing applications 114 may include or utilize a traffic generator. For example, a traffic generator may be any suitable entity or entities (e.g., software executing on a processor, an ASIC, an FPGA, or a combination of software, an ASIC, or an FPGA) for performing one or more aspects associated with generating or synthesizing test sessions, test cases, or related test packets. In this example, the traffic generator may be configured to utilize user input and predefined test case templates or related data to generate one or more test cases and/or test sessions.

In some embodiments, testing applications 114 may include or utilize a network visibility analyzer and may be configurable by TC 104 and/or based on an emulated switching environment or topology. For example, a network visibility analyzer may be any suitable entity or entities (e.g., software executing on a processor, an ASIC, an FPGA, or a combination of software, an ASIC, or an FPGA) for maintaining network visibility (e.g., using virtual or physical probes or network taps). In this example, virtual taps or software may be configured to emulate and/or provide switch metrics or other information (e.g., network telemetry, switch and/or link status information, etc.) associated with one or more elements (e.g., emulated switches) of an emulated switching environment. Continuing with this example, the network visibility analyzer may generate performance reports or test analysis reports associated with SUT 118, e.g., by utilizing the switch metrics or other information associated with packets that pass through or are generated by SUT 118.

ASIC switch(es) 108 may be any suitable entity or entities comprising one or more ASICs (and hardware, firmware, and/or software) for performing one or more functions associated with network switching. For example, ASIC switch(es) 108 may utilize an ASIC pipeline for performing frame or packet forwarding, e.g., sending a packet received from one port out another port of the switch. In some embodiments, various resources (e.g., lookup tables or match-action tables used for forwarding decisions, traffic manager buffer memory, traffic manager logical queues, etc.) of ASIC switch(es) 108 may managed and/or allocated to provide virtualized or emulated switches by SARA 106.

Ports 110 may include or utilize any suitable entity or entities (e.g., one or more network interface cards (NICs), pluggable jacks, physical processors, transceiver modules, direct-attach cables (DACs) and/or other hardware) for sending or receiving communications. For example, test system 102 may use one or more multiple ports 110 (e.g., physical connection ports) for receiving and sending various types of test packets or related data units; such as IP messages, Ethernet frames, Ethernet messages, packet data units (PDUs), datagrams, user datagram protocol (UDP) messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, ports 110 may include user traffic ports and management ports. For example, user traffic ports may be associated with processing, sending, and/or receiving test traffic, non-test traffic, and/or in-band management related communications and management ports may be associated with processing, sending, and/or receiving out-of-band management related communications.

In some embodiments, ports 110 may include multiple port modules or groups of ports for interacting with SUT 118. For example, depending on a test operator's configuration settings or a particular test session setup, SARA 106 may allocate a portion of physical resources to each switch that is emulated, where the emulated switches are collectively used to mimic a data center switching fabric. In some embodiments, each emulated switch may be allocated or associated with one or more of ports 110 and the port association may be static or semi-static (e.g., particular ports may be assigned to an emulated switch for a given test session).

SARA 106 may be any suitable entity or entities (e.g., software executing on a processor, an FPGA, an ASIC, or a combination of software, an FPGA, and/or an ASIC) for performing one or more aspects associated with allocating and managing emulated switches. In some embodiments, SARA 106 may allocate and manage resources of ASIC switch(es) 108 for providing emulated switches without requiring a custom ASIC pipeline. In some embodiments, SARA 106 can be external or internal to ASIC switch(es) 108.

In some embodiments, SARA 106 may utilize one or more management ports or related interfaces for communicating with a controller or related applications (e.g., TC 104 and/or testing applications 114) and/or for communicating with ASIC switch(es) 108. For example, TC 104 or a related application may communicate with SARA 106 via an out-of-band management port or related interface. In this example, SARA 106 may send instructions or other communications to ASIC switch(es) 108 via another management port or related interface.

In some embodiments, SARA 106 may include a virtual to physical adapter 112. Virtual to physical adapter 112 may be any suitable entity or entities (e.g., software executing on a processor, an FPGA, a ASIC, or a combination of software, an FPGA, and/or an ASIC) for converting and/or translating communications to refer to virtual or physical resources depending on the destination. For example, when requesting information about available switching resources via SARA 106, testing applications 114 and/or SUT 118 may "see" a set of emulated switches each with a subset of resources instead of ASIC switch(es) 108. In this example, virtual to physical adapter 112 may translate information about virtual resources into information physical resources of a single ASIC switch (e.g., Tomahawk 3) and vice versa so that interacting nodes may remain unaware of the underlying ASIC switch(es) 108 or related switch resources.

In some embodiments, SARA 106 and/or virtual to physical adapter 112 may reside between a native device interface and interacting entities (e.g., SUT 118, testing applications 114, or external devices) and may act as a communications proxy or agent using a virtual interface. For example, SUT 118 may include a network switch controller that configures switching resources by sending, via a virtual interface associated with SARA 106, configuration requests for requesting and/or configuring one or more switches. In this example, SARA 106 and/or virtual to physical adapter 112 may translate the configuration requests received via the virtual interface into one or more corresponding requests for transmission via a native switch interface, where the corresponding requests include commands for configuring appropriate physical resources of underlying ASIC switch(es) 108. Further, SARA 106 and/or virtual to physical adapter 112 may translate switch performance results coming from a native switch interface into virtualized results (e.g., link status or counter values for a physical port '60' may be changed to values for a virtual port 'v1' on an emulated switch 'TORSW1') before sending the virtualized results to the network switch controller via the virtual interface.

In some embodiments, SARA 106 and/or virtual to physical adapter 112 may create, store, and/or use switch ASIC emulation data (e.g., physical to virtual port mapping, physical buffers to virtual buffers mapping and resource allocation, etc.) and related policies (e.g., virtual and real port speed, virtual and real throughput, topologies, forwarding rules, classes of service, etc.) for sharing physical switch resources amongst the emulated switches. For example, by using port mapping data and policies stored in data storage 116, virtual ports 'v1', 'v2', 'v3' on an emulated switch 'TORSW1' may be translated into physical ports '60', '61', '62', respectively. In this example, configuration commands for setting speed of port 'v1' can be translated so that the speed of corresponding physical port '60' is set. Continuing with this example, to query the statistical counters for virtual port 'v1', the statistical counters for physical port '60' may be queried.

In some embodiments, SARA 106 and/or virtual to physical adapter 112 may utilize a modified proprietary (e.g., vendor) API (e.g., a vendor's software development kit (SDK) or by utilizing a wrapper API that interacts with a vendor API. For example, by using a wrapper API, SARA 106 can manage a virtualized or emulated fleet of switches using off-the-shelf or commodity ASICs with NOSes that utilize a proprietary or vendor API.

In some embodiments, SARA 106 and/or virtual to physical adapter 112 may utilize a custom adaptor that handles certain applications or functions which may involve a subset of resource management and mapping requirements than a standard switching API. For example, by using a custom adaptor, SARA 106 can manage a virtualized or emulated fleet of switches for certain use cases using off-the-shelf or commodity ASICs.

In some embodiments, test system 102 or entities thereof (e.g., TC 104, testing applications 114, and/or SARA 106) may include functionality for accessing data storage 116. Data storage 116 may be any suitable entity or entities (e.g., a storage device, a non-transitory computer readable medium, or a storage system) for maintaining or storing information related to switch ASIC emulation, network testing, or related test analysis. For example, data storage 116 may include switch ASIC emulation data (e.g., physical to virtual port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. Data storage 116 may also include test traffic models, test cases, test session data, topology information for emulated switching environments and/or for SUT 118, and/or other information usable for generating performance metrics (e.g., statistics) associated with one or more aspects of SUT 118. In some embodiments, data storage 116 may be located at test system 102, another node, or distributed across multiple platforms or devices.

It will be appreciated that FIG. 1 is for illustrative purposes and that various depicted entities, their locations, and/or their functions described above in relation to FIG. 1 may be changed, altered, added, or removed. For example, a device (e.g., a computer including at least one processor coupled to a memory) may include functionality of TC 104, SARA 106, and testing applications 114.

Figure 2:
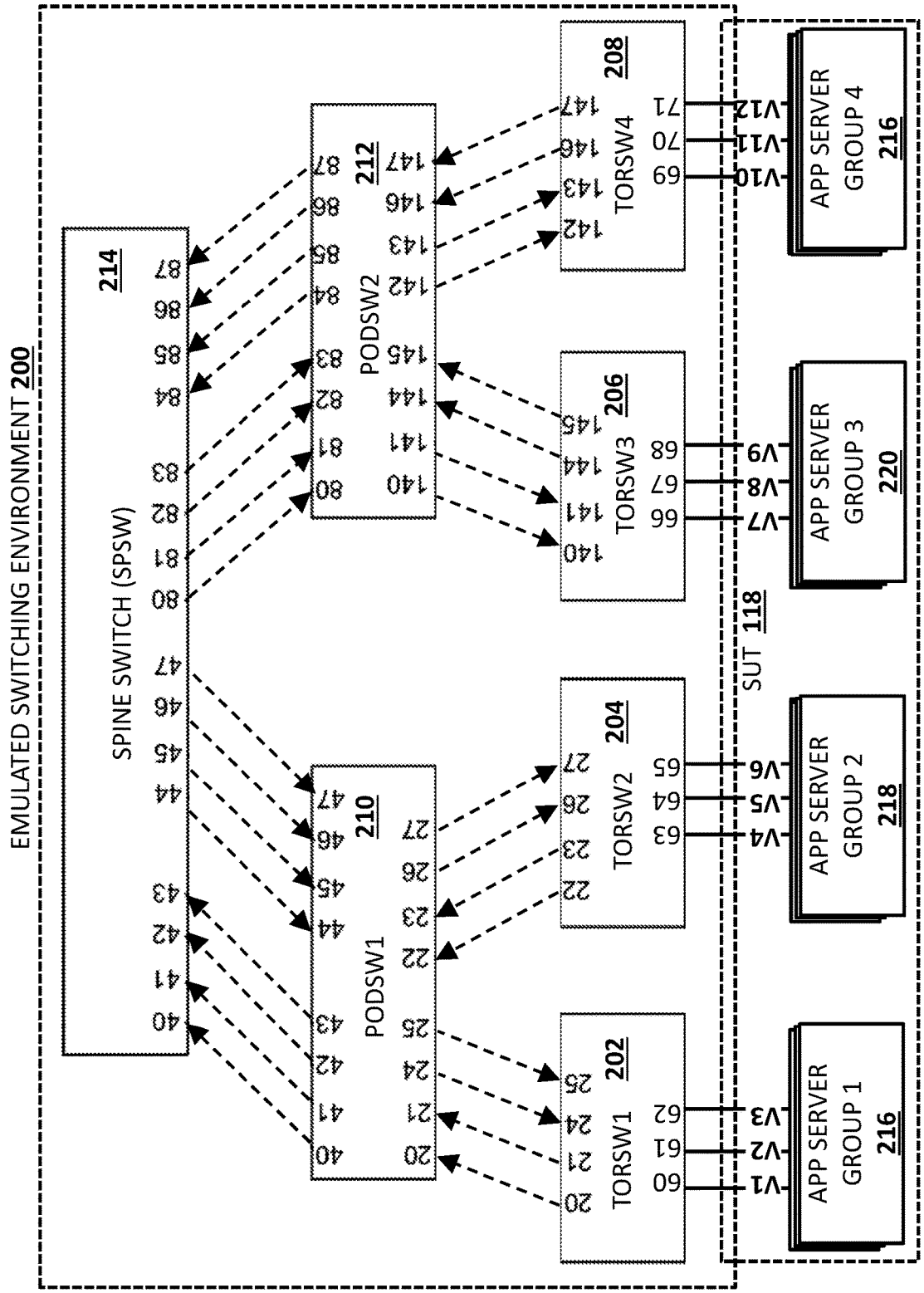
FIG. 2 is a diagram illustrating an example emulated switching environment usable for network testing.

FIG. 2 is a diagram illustrating an example emulated switching environment 200 usable for network testing. Emulated switching environment 200 may represent an emulated data center environment or a network of switches for forwarding packets from or to SUT 118 or other entities. For example, emulated switching environment 200 may be based on user input and/or predetermined environment templates or data models, e.g., stored in data storage 116.

Referring to FIG. 2, emulated switching environment 200 may represent a 3-stage Clos switching network comprising different stages of emulated switches, e.g., stage one may include top of rack switches (TORSWs) 202-208, stage two may include cluster or pod switches (PODSWs) 210-212, and stage three may include a spine switch (SPSW) 214 and may be implemented using SARA 106 and physical resources of one or more ASIC switch(es) 108. For example, TORSWs 202-208 may represent or emulate switches that are connected to multiple servers (e.g., located within a rack or nearby rack), PODSWs 210-212 may represent or emulate aggregation switches that are connected to multiple TORSWs, and SPSW 214 may represent or emulate a higher-level aggregation switch that is connected to multiple PODSWs.

In some embodiments, some physical ports of ASIC switch(es) 108 may be associated with different emulated switches and may utilize loopback interfaces or internal interfaces for emulating communications between some emulated switches, while other emulated switches (e.g., TORSWs 202-208) may utilize physical interfaces and/or physical cabling to communicate with SUT 118 or portions thereof.

In some embodiments, SUT 118 may represent or include a set of application server groups 216-222, each representing one or more servers and/or applications. For example, application server group 1 216 may include multiple servers (e.g., 16 or more servers in a single rack), each having one or more connections to a TOR switch. In some examples, a server of application server groups 216-222 may includes multiple applications or perform different services (e.g., machine learning (M/L), storage offload, search engines, webpages, video streaming, email, etc.) for users or may perform similar services for different sets of users. In some examples, a server of application server groups 216-222 may act as a client to another server.

In some embodiments, each of application server groups 216-222 may be connected (e.g., physically cabled) to a different set of physical ports 110 of test system 102, where each set of physical ports 110 is assigned or allocated to a particular emulated switch. For example, SARA 106 may assign physical ports '60', '61', and 62' to an emulated switch 'TORSW1' and may virtualize those physical ports as 'v1', 'v2', and 'v3', respectively. In this example, applications and/or servers in application server group 1 216 may be communicatively coupled to one or more of the virtual ports of the emulated switch 'TORSW1'.

It will be appreciated that FIG. 2 is for illustrative purposes and that various depicted entities, their locations, and/or their functions described above in relation to FIG. 2 may be changed, altered, added, or removed.

FIG. 3 is a diagram illustrating example switching configuration information 300. In some embodiments, configuration information 300 may be accessed and/or stored by TC 104 and/or SARA 106 using one or more data structures. In some embodiments, configuration information 300 may include any suitable information for mapping virtual ports associated with emulated switching environment 200 to physical ports of physical ASIC switch(es) 108. In some embodiments, configuration information 300 may be stored or maintained in data storage 116 and may be usable for translating port information or related information in switch configuration commands, performance metrics, and/or other communications.

Referring to FIG. 3, configuration information 300 may be depicted using a table representing associations between a topology identifier (TI D) and a corresponding topology description. In some embodiments, a TID may include any suitable identifier, such as one or more numbers or values, usable for identifying a switching topology or emulated switching environment. For example, each switching topology or emulated switching environment provided by a test operator or stored for testing may have a different, unique TID, e.g., 1, 2, 3, and 4, respectively.

In some embodiments, a topology description may include information for describing or defining an emulated switching environment, e.g., emulated switching environment 200. For example, a topology description may indicate the type of switching environment including the number of stages, the types and number of emulated switches and ports at each stage, along with various characteristics (e.g., port speeds, link speeds, forwarding rules, throughput limits, etc.) that can be used to emulate or virtualize the switching environment described.

It will be appreciated that configuration information 300 in FIG. 3 is for illustrative purposes and that different and/or additional information may also be stored or maintained. Further, it will be appreciated that configuration information 300 may be stored in various data structures, memories, media, and/or in one or more locations.

FIG. 4 is a diagram illustrating example port mapping data 400 for mapping virtual ports of emulated switches (e.g., TORSWs 202-208) to physical ports of physical ASIC switch(es) 108. In some embodiments, port mapping data 400 may be accessed and/or stored by TC 104 and/or SARA 106 using one or more data structures. In some embodiments, port mapping data 400 may include any suitable information for mapping virtual ports associated with emulated switching environment 200 to physical ports of physical ASIC switch(es) 108. In some embodiments, port mapping data 400 may be stored or maintained in data storage 116 and may be usable for translating port information or related information in switch configuration commands, performance metrics, and/or other communications.

Referring to FIG. 4, port mapping data 400 may be depicted using a table representing associations between virtual port information and physical port information. For example, each row or association may include a TID, an emulated switch identifier (ESID), a virtual port number, and a corresponding physical switch identifier (PSID) and a physical port number.

In some embodiments, a TID may include any suitable identifier, such as one or more numbers or values, usable for identifying a switching topology or emulated switching environment. For example, a test operator may select a 3-stage Clos network environment with particular characteristics to emulate for a first test session, a 3-stage Clos network environment with different characteristics to emulate for a second test session, a 5-stage Clos network environment with particular characteristics to emulate for a third test session, and a 7-stage Clos network environment with particular characteristics to emulate for a fourth test session. In this example, each switching topology or emulated switching environment may have a different, unique TID, e.g., 1, 2, 3, and 4, respectively.

In some embodiments, an ESID may include any suitable identifier, such as one or more numbers or values, usable for identifying an emulated switch. For example, emulated switching environment 200 may have seven emulated switches, each switch having a unique name and/or number, e.g., 'TORSW1', 'A', '234553242', etc. In some embodiments, ESIDs may be unique within a topology or an emulated switching environment. In some embodiments, ESID may be unique amongst multiple (or even all) defined topologies or emulated switching environments.

In some embodiments, a virtual port number may include any suitable identifier, such as one or more numbers or values, usable for identifying a port of an emulated switch. For example, an emulated switch 'PODSW1' of emulated switching environment 200 may have multiple virtual ports, each having a unique name and/or number at least within that emulated switch, e.g., 'v1', 'v2', 'v3', etc. In some embodiments, virtual port numbers may be unique within a topology or an emulated switching environment. In some embodiments, virtual port numbers may be unique amongst multiple (or even all) defined topologies or emulated switching environments.

In some embodiments, an ESID may include any suitable identifier, such as one or more numbers or values, usable for identifying a physical switch, e.g., physical ASIC switch(es) 108. For example, test system 102 may have one or two physical ASIC switch(es) 108, each switch having a unique name and/or number, e.g., 'SW1, 'A', '234553242', etc. In some embodiments, PSIDs may be unique within a test system or network. In some embodiments, ESID may be unique amongst multiple (or even all) networks controlled by an operator or service provider.

In some embodiments, a physical port number may include any suitable identifier, such as one or more numbers or values, usable for identifying a port of physical ASIC switch(es) 108. For example, physical ASIC switch(es) 108 may have multiple physical traffic ports, each having a unique name and/or number at least within each physical switch, e.g., '60', '61', '62', etc. In some embodiments, physical port numbers may be unique within each of physical ASIC switch(es) 108. In some embodiments, physical port numbers may be unique amongst multiple (or even all) physical ASIC switch(es) 108.

In some embodiments, e.g., where multiple emulated switching environments (e.g., for different test sessions or network configurations) are stored, a TID, an ESID, and a virtual port number may be used as a combination key or value for identifying a corresponding physical switch and port. In some embodiments, e.g., where one emulated switching environment 200 is stored, an ESID and a virtual port number may be used as a combination key or value for identifying a corresponding physical switch and port. In some embodiments, e.g., where each virtual port number is unique in emulated switching environment 200, a virtual port number may be used as a combination key or value for identifying a corresponding physical switch and port.

It will be appreciated that port mapping data 400 in FIG. 4 is for illustrative purposes and that different and/or additional information may also be stored or maintained. Further, it will be appreciated that port mapping data 400 may be stored in various data structures, memories, media, and/or in one or more locations.

Figure 5:
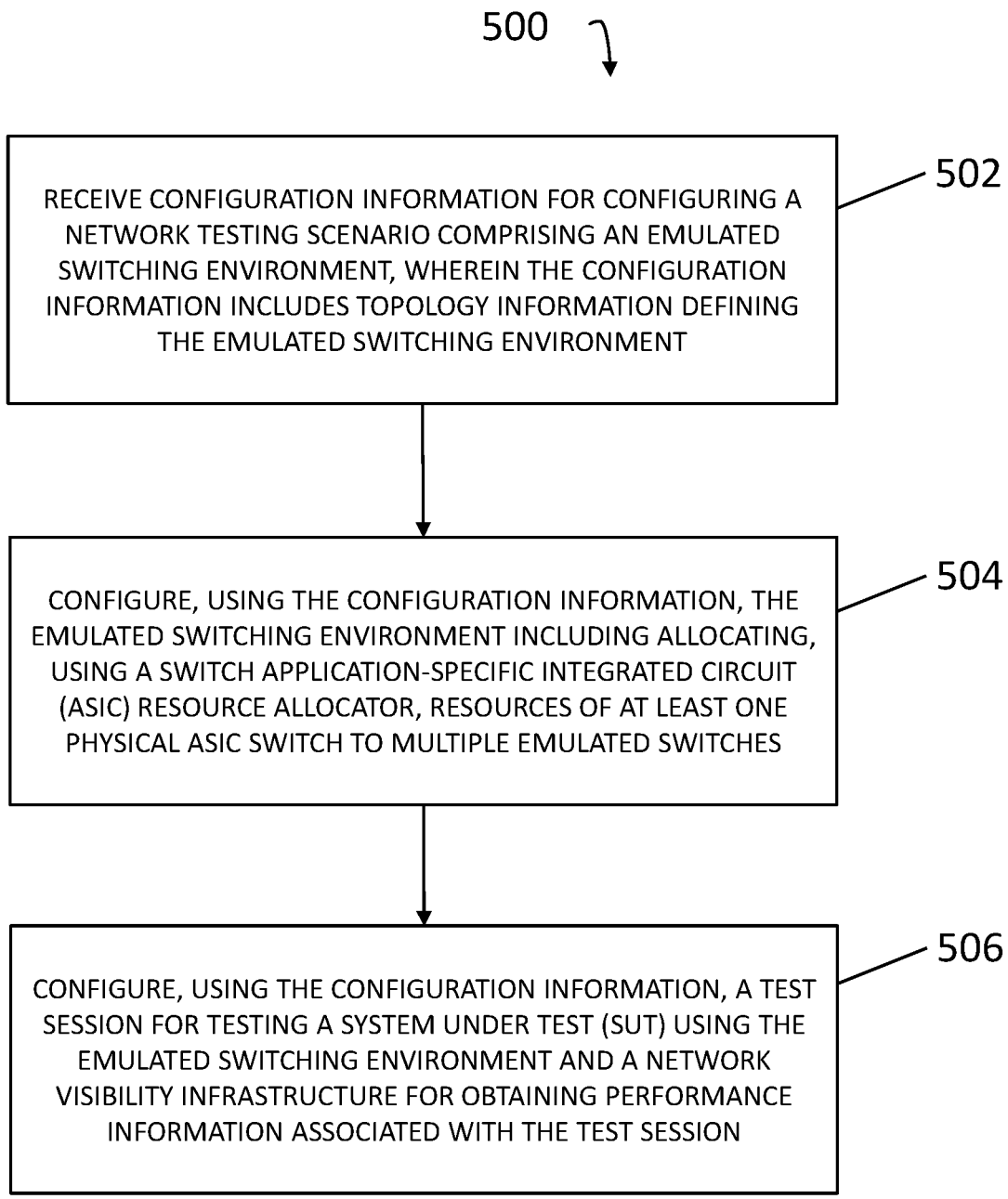
FIG. 5 is a diagram illustrating an example process for network testing using switch emulation.

FIG. 5 is a diagram illustrating an example process 500 for network testing using switch emulation. In some embodiments, process 500, or portions thereof, may be performed by or at test system 102, TC 104, SARA 106, ASIC switch(es) 108, and/or another node or module (e.g., a network test controller). In some embodiments, process 500 may include steps 502-506.

Referring to process 500, in step 502, configuration information may be received for configuring a network testing scenario comprising an emulated switching environment, wherein the configuration information includes topology information defining the emulated switching environment.

In some embodiments, receiving configuration information may include providing a user interface for defining emulated switching environment 200 involving the emulated switches.

In step 504, the emulated switching environment including allocating, using a switch ASIC resource allocator, resources of at least one physical ASIC switch to multiple emulated switches may be configured using the configuration information.

In step 508, a test session for testing a SUT using the emulated switching environment and a network visibility infrastructure for obtaining performance information associated with the test session may be configured using the configuration information.

In some embodiments, e.g., after configuring a network test scenario and a related test session, the test session may be initiated. For example, initiating the test session may include generating and sending, using a traffic generator, test traffic via the emulated switching environment. In this example, the test traffic may include background test traffic that traverses or impacts the emulated switching environment but does not traverse the SUT. In another example, test traffic may traverse the emulated switching environment on it way to or from the SUT.

In some embodiments, e.g., during or after a test session, a performance query for accessing performance information about emulated switching environment 200 may be received from a requester (e.g., a test operator or a related system). In some embodiments, emulated switching environment 200 may be implemented using at least one physical ASIC switch.

In some embodiments, emulated switching environment 200 may include a first emulated switch for communications involving a first set of physical ports connecting a first portion of SUT 118 and the network test system and a second emulated switch for communications involving a second set of physical ports connecting a second portion of SUT 118 and the network test system. In some embodiments, a first emulated switch or a second emulated switch appear as a rack switch to SUT 118.

In some embodiments, a first portion of SUT 118 may include a first network node, a first server, a first network interface card, a first application server, or a first group of servers and wherein a second portion of SUT 118 may include a second network node, a second server, a second network interface card, a second application server, or a second group of servers.

In some embodiments, a performance query from a requester may be translated using physical to virtual resource mapping information into at least one corresponding information request that refers to physical resources of the at least one physical ASIC switch associated with emulated switching environment 200. In such embodiments, the at least one corresponding information request may be sent to the at least one physical ASIC switch or a related controller.

In some embodiments, a response to an information request may be received from a physical ASIC switch or a related controller and may contain switch performance information associated with the at least one corresponding information request.

In some embodiments, switch performance information from a physical ASIC switch or a related controller may be translated using the physical to virtual resource mapping information to the performance information about emulated switching environment 200. In such embodiments, the performance information about emulated switching environment 200 may be provided to the requester. For example, a requester may a network controller, an NMS, an NOS, SUT 118, an SDN controller, a test operator, or another entity.

In some embodiments, prior to receiving the performance query, the network test system may configure and initiate a test session for testing SUT 118.

In some embodiments, configuring the test session may include configuring emulated switching environment 200 including accessing topology information describing an emulated network, an emulated device, an emulated host, a traffic generator, one or more physical or virtual connections, emulated switching environment 200, or SUT 118.

In some embodiments, configuring the test session may include accessing topology information describing an emulated network, an emulated device, an emulated host, a traffic generator, one or more physical or virtual connections, emulated switching environment 200, or SUT 118.

In some embodiments, configuring the test session may include configuring a traffic generator for generating test traffic based on predetermined or learned traffic patterns.

In some embodiments, configuring the test session may include configuring a network visibility analyzer for collecting, analyzing, or reporting emulated switching environment information, e.g., emulated switch status information or telemetry information.

In some embodiments, emulated switching environment 200 may include a Clos network environment, a multi-stage network environment, or a multi-tier network environment.

In some embodiments a test session involving SARA 106 and a first portion of SUT 118 and a second portion of SUT 118 may comprise receiving, by SARA 106 and from the first portion, a communication addressed to the second portion; and emulating, using SARA 106, forwarding of the communication to the second portion via emulated switching environment 200, wherein emulating includes translating a virtual port of the second emulated switch to a physical port of the at least one physical ASIC switch connected to the second portion and sending, via the physical port of the at least one physical ASIC switch, the communication to the second portion.

In some embodiments, forwarding a communication to the second portion via emulated switching environment 200 may be emulated using SARA 106, wherein emulating may include translating a virtual port of the second emulated switch to a physical port of the at least one physical ASIC switch connected to the second portion and sending, via the physical port of the at least one physical ASIC switch, the communication to the second portion.

In some embodiments, emulating forwarding may include using one or more loopback interfaces on at least one physical ASIC switch.

In some embodiments, TC 104, testing applications 114, SARA 106, and/or other test system entities may communicate via a test system API or a related server. In such embodiments, the test system API or the related server may convert or translate higher-level instructions (e.g., a gRPC API request for performance information) or data models into lower level instructions (e.g., an ASIC register query) or data models for the physical ASIC switch.

It will be appreciated that process 500 is for illustrative purposes and that different and/or additional actions may be used. It will also be appreciated that various actions described herein may occur in a different order or sequence.

It should be noted that test system 102, TC 104, SARA 106, computing environment 100, and/or functionality described herein may constitute one or more special purpose computing devices. Further, test system 102, TC 104, SARA 106, computing environment 100, and/or functionality described herein can improve the technological field of testing networks and related nodes by providing mechanisms for switch ASIC emulation, e.g., emulating emulated switches using one or more physical ASIC switches and a switch ASIC resource allocator.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for network testing using switch emulation, the method comprising:
    at a network test system implemented using at least one processor:
        receiving configuration information for configuring a network testing scenario comprising an emulated switching environment, wherein the configuration information includes topology information defining the emulated switching environment;
        configuring, using the configuration information, the emulated switching environment including allocating, using a switch application-specific integrated circuit (ASIC) resource allocator, resources of at least one physical ASIC switch to multiple emulated switches; and
        configuring, using the configuration information, a test session for testing a system under test (SUT) using the emulated switching environment and a network visibility infrastructure for obtaining performance information associated with the test session.

2. The method of claim 1, the method comprising:
    initiating the test session, wherein initiating the test session includes generating and sending, using a traffic generator, test traffic via the emulated switching environment; and
    during or after the test session:
        receiving, from a requester, a performance query for accessing performance information about the emulated switching environment, wherein the emulated switching environment is implemented using at least one physical ASIC switch, wherein the emulated switching environment includes a first emulated switch for communications involving a first set of physical ports connecting a first portion of the SUT and the network test system and a second emulated switch for communications involving a second set of physical ports connecting a second portion of the SUT and the network test system;
        translating, using physical to virtual resource mapping information, the performance query into at least one corresponding information request that refers to physical resources of the at least one physical ASIC switch associated with the emulated switching environment;
        sending the at least one corresponding information request to the at least one physical ASIC switch or a related controller;
        receiving a response containing switch performance information associated with the at least one corresponding information request;
        translating, using the physical to virtual resource mapping information, the switch performance information to the performance information about the emulated switching environment; and
        providing the performance information about the emulated switching environment to the requester.

3. The method of claim 2 wherein the test session comprises:
    receiving, by the switch ASIC resource allocator and from the first portion, a communication addressed to the second portion; and
    emulating, using the switch ASIC resource allocator, forwarding of the communication to the second portion via the emulated switching environment, wherein emulating includes translating a virtual port of the second emulated switch to a physical port of the at least one physical ASIC switch connected to the second portion and sending, via the physical port of the at least one physical ASIC switch, the communication to the second portion.

4. The method of claim 3 wherein emulating the forwarding includes using one or more loopback interfaces on the at least one physical ASIC switch.

5. The method of claim 2 wherein the traffic generator, the switch ASIC resource allocator, or other test system entities communicate via a test system API or a related server.

6. The method of claim 5 wherein the test system API or the related server converts or translates higher-level instructions or data models into lower level instructions or data models for the physical ASIC switch.

7. The method of claim 2 wherein the first portion of the SUT includes a first network node, a first server, a first network interface card, a first application server, or a first group of servers and wherein the second portion of the SUT includes a second network node, a second server, a second network interface card, a second application server, or a second group of servers.

8. The method of claim 1 wherein the emulated switching environment includes a Clos network environment, a multi-stage network environment, or a multi-tier network environment.

9. The method of claim 1 wherein configuring the test session includes configuring a traffic generator for generating test traffic based on predetermined or learned traffic patterns;
    wherein configuring the network visibility infrastructure includes configuring a network visibility analyzer for collecting, analyzing, or reporting emulated switching environment information;
    wherein the topology information defining the emulated switching environment includes information about the emulated switches, an emulated host, one or more physical or virtual connections associated with the emulated switching environment, or one or more physical or virtual connections associated with the SUT; or
    wherein receiving configuration information for configuring the network testing scenario includes providing a user interface for defining the emulated switching environment involving the emulated switches.

10. A system for network testing using switch emulation, the system comprising:
    at least one processor;
    a network test system implemented using the at least one processor, wherein the test system is configured for:
        receiving configuration information for configuring a network testing scenario comprising an emulated switching environment, wherein the configuration information includes topology information defining the emulated switching environment;

configuring, using the configuration information, the emulated switching environment including allocating, using a switch application-specific integrated circuit (ASIC) resource allocator, resources of at least one physical ASIC switch to multiple emulated switches; and configuring, using the configuration information, a test session for testing a system under test (SUT) using the emulated switching environment and a network visibility infrastructure for obtaining performance information associated with the test session.

11. The system of claim 10, wherein the test system is further configured for:

initiating the test session, wherein initiating the test session includes generating and sending, using a traffic generator, test traffic via the emulated switching environment; and during or after the test session:

receiving, from a requester, a performance query for accessing performance information about the emulated switching environment, wherein the emulated switching environment is implemented using at least one physical ASIC switch, wherein the emulated switching environment includes a first emulated switch for communications involving a first set of physical ports connecting a first portion of the SUT and the network test system and a second emulated switch for communications involving a second set of physical ports connecting a second portion of the SUT and the network test system;

translating, using physical to virtual resource mapping information, the performance query into at least one corresponding information request that refers to physical resources of the at least one physical ASIC switch associated with the emulated switching environment;

sending the at least one corresponding information request to the at least one physical ASIC switch or a related controller;

receiving a response containing switch performance information associated with the at least one corresponding information request;

translating, using the physical to virtual resource mapping information, the switch performance information to the performance information about the emulated switching environment; and providing the performance information about the emulated switching environment to the requester.

12. The system of claim 11 wherein the test session comprises:

receiving, by the switch ASIC resource allocator and from the first portion, a communication addressed to the second portion; and emulating, using the switch ASIC resource allocator, forwarding of the communication to the second portion via the emulated switching environment, wherein emulating includes translating a virtual port of the second emulated switch to a physical port of the at least one physical ASIC switch connected to the second portion and sending, via the physical port of the at least one physical ASIC switch, the communication to the second portion.

13. The system of claim 12 wherein emulating the forwarding includes using one or more loopback interfaces on the at least one physical ASIC switch.

14. The system of claim 11 wherein the traffic generator, the switch ASIC resource allocator, or other test system entities communicate via a test system API or a related server.

15. The system of claim 14 wherein the test system API or the related server converts or translates higher-level instructions or data models into lower level instructions or data models for the physical ASIC switch.

16. The system of claim 11 wherein the first portion of the SUT includes a first network node, a first server, a first network interface card, a first application server, or a first group of servers and wherein the second portion of the SUT includes a second network node, a second server, a second network interface card, a second application server, or a second group of servers.

17. The system of claim 10 wherein the emulated switching environment includes a Clos network environment, a multi-stage network environment, or a multi-tier network environment.

18. The system of claim 10 wherein configuring the test session includes configuring a traffic generator for generating test traffic based on predetermined or learned traffic patterns;

wherein configuring the network visibility infrastructure includes configuring a network visibility analyzer for collecting, analyzing, or reporting emulated switching environment information;

wherein the topology information defining the emulated switching environment includes information about the emulated switches, an emulated host, one or more physical or virtual connections associated with the emulated switching environment, or one or more physical or virtual connections associated with the SUT; or wherein receiving configuration information for configuring the network testing scenario includes providing a user interface for defining the emulated switching environment involving the emulated switches.

19. A non-transitory computer readable medium having stored thereon executable instructions embodied in the computer readable medium that when executed by at least one processor of a network test system cause the network test system to perform steps comprising:

receiving configuration information for configuring a network testing scenario comprising an emulated switching environment, wherein the configuration information includes topology information defining the emulated switching environment;

configuring, using the configuration information, the emulated switching environment including allocating, using a switch application-specific integrated circuit (ASIC) resource allocator, resources of at least one physical ASIC switch to multiple emulated switches; and configuring, using the configuration information, a test session for testing a system under test (SUT) using the emulated switching environment and a network visibility infrastructure for obtaining performance information associated with the test session.

20. The non-transitory computer readable medium of claim 19, performing additional steps comprising:

initiating the test session, wherein initiating the test session includes generating and sending, using a traffic generator, test traffic via the emulated switching environment; and during or after the test session:

receiving, from a requester, a performance query for accessing performance information about the emulated switching environment, wherein the emulated switching environment is implemented using at least one physical ASIC switch, wherein the emulated switching environment includes a first emulated switch for communications involving a first set of physical ports connecting a first portion of the SUT and the network test system and a second emulated switch for communications involving a second set of physical ports connecting a second portion of the SUT and the network test system;

translating, using physical to virtual resource mapping information, the performance query into at least one corresponding information request that refers to physical resources of the at least one physical ASIC switch associated with the emulated switching environment;

sending the at least one corresponding information request to the at least one physical ASIC switch or a related controller;

receiving a response containing switch performance information associated with the at least one corresponding information request;

translating, using the physical to virtual resource mapping information, the switch performance information to the performance information about the emulated switching environment; and providing the performance information about the emulated switching environment to the requester.

* * * * *